(12) United States Patent
Ikeda et al.

(10) Patent No.: US 6,641,869 B2
(45) Date of Patent: Nov. 4, 2003

(54) METHOD FOR PRODUCING ELECTRODE FOR ALKALI BATTERIES

(75) Inventors: Yasuhiko Ikeda, Itano-gun (JP); Masao Takee, Itano-gun (JP); Teruhiko Imoto, Itano-gun (JP); Masao Inoue, Tokushima (JP); Atsutoshi Ako, Itano-gun (JP); Yasumasa Kondo, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/084,161

(22) Filed: Feb. 28, 2002

(65) Prior Publication Data

US 2002/0160101 A1 Oct. 31, 2002

(30) Foreign Application Priority Data

Feb. 28, 2001 (JP) ........................................ 2001-053583

(51) Int. Cl.$^7$ ................................................. B05D 3/12
(52) U.S. Cl. ........................ 427/366; 427/359; 427/360; 427/365; 427/383.7
(58) Field of Search ................................ 427/359, 360, 427/365, 366, 383.7; 429/218.2

(56) References Cited

U.S. PATENT DOCUMENTS 5,290,359 A * 3/1994 Coonen et al. ............. 118/712
5,542,958 A * 8/1996 Furukawa ................... 29/623.1
6,228,533 B1 * 5/2001 Ohashi et al. .............. 429/217
6,327,136 B1 * 12/2001 Meguro et al. ............. 361/502

* cited by examiner

Primary Examiner—Katherine A. Bareford
(74) Attorney, Agent, or Firm—Nixon & Vanderhye P.C.

(57) ABSTRACT

An active material slurry 12a obtained by a mixing a powder of the active material with a binder and a solvent for the binder is heated to a predetermined temperature inside a slurry reservoir 20, and the heated active material slurry 12a is coated and adhered to an electrically conductive core body 11. The resulting body is then fed inside a drying furnace 28 to dry the coated and adhered active material slurry 12a by heating, and is rolled to a predetermined thickness by passing it through a pair of rolling rolls 29, thereby obtaining an electrode for alkaline batteries comprising an active material layer 12 on the both sides of the electrically conductive core body 11. On drying the active material slurry 12a that is coated and adhered to the electrically conductive core body 11, the transfer of the binder inside the active material slurry 12a is suppressed, such that the decrease in the amount of the binder inside the active material layer 12 in the vicinity of the electrically conductive core body 11 is prevented from occurring. Thus is obtained an electrode for alkaline batteries 10 improved in adhesion strength.

2 Claims, 1 Drawing Sheet

METHOD FOR PRODUCING ELECTRODE FOR ALKALI BATTERIES

BACKGROUND OF THE INVENTION

1. Field of the Invention

The present invention relates to a method for producing an electrode for alkaline batteries, which is formed by coating and adhering a slurry of an active material comprising a powder of active material, a binder, and a solvent for the binder on an electrically conductive core body.

2. Description of the Related Art

Recently, with the increase in compact mobile appliances, demand for chargeable and dischargeable secondary cells (batteries) is increasing. In particular, the demand for high capacity low-cost alkaline batteries such as nickel-hydrogen batteries is rapidly increasing with the appliances decreasing in size and thickness, and which are increasing space efficiency. The electrodes for use in this type of alkaline batteries are obtained by coating and adhering a slurry of active material, which is formed by kneading a powder of active material with a water-soluble binder and a solvent for the water-soluble binder, i.e., pure water or water, on the both sides of an electrically conductive core body made from a punching metal and the like retaining an active material layer. In general, after the active material slurry is coated and adhered to the electrically conductive core body, the resulting body is subjected to a step of naturally drying at an ordinary temperature (about 20° C.).

However, on naturally drying the electrode for alkaline batteries having coated and adhered thereon the slurry of active material, it had been found that the drying rate is so low, and that it generally takes a long duration of time of about 5 to 6 hours to dry the electrode for alkaline batteries. This led to a problem of poor production efficiency of batteries for alkaline batteries.

SUMMARY OF THE INVENTION

In order to overcome the above problem, there has been proposed a method comprising coating and adhering a slurry of active material on the both sides of an electrically conductive core body, and drying the resulting body at a high temperature (about 60° C.). By drying the electrode for alkaline batteries having the slurry of active material coated and adhered thereon at high temperature in this manner, it was found that the dry time is reduced to 15 to 30 minutes. This resulted in an increase in production efficiency of electrodes for alkaline batteries.

In order to increase the production efficiency by speeding up the dry rate of the electrode for alkaline batteries, the electrode for alkaline batteries must be dried at a high temperature as described above. When the electrode for alkaline batteries is dried at a high temperature, the evaporation rate of water increases as such that the water contained in the active material layer moves rapidly from the interior of the electrode for alkaline batteries to the surface (the side of the drying plane). However, if water contained in the active material layer is rapidly moved, the binder contained in the active material layer also moves with the movement of water. As a result, the binder thus moved solidifies segregated on the surface of the electrode for alkaline batteries. Hence, there occurred a phenomenon that the amount of binder of the active layer in the vicinity of the electrically conductive core body located at the center of the electrode for alkaline batteries becomes too scarce.

In case the amount of binder contained in the active layer in the vicinity of the electrically conductive core body becomes too small, the adhesion power among the active materials present in the vicinity of the electrically conductive core body or the adhesive power between the electrically conductive core body and the active material decreases, and this resulted in a problem that the active material layer easily drops off from the electrically conductive core body.

In the light of such circumstances, the present invention has been made to overcome the above problems. More specifically, an object of the present invention is to provide a production method for the electrode of alkaline batteries, in which the temperature for drying the electrode for alkaline batteries having coated and adhered thereon the active material is elevated to increase the production efficiency, but which is yet capable of suppressing the drop in strength of the electrode for alkaline batteries and of providing a high quality alkaline battery.

In order to achieve the object above, the present invention provides a production method for an elec. formed by coating and adhering a slurry of an active material comprising a powder of active material, a binder, and a solvent for the binder on an electrically conductive core body, said method comprising: a step of preparing a slurry of an active material by mixing the powder of active material with a binder and a solvent for the binder; a step of heating the slurry of the active material; and a step of coating and adhering slurry, in which the heated slurry is coated and adhered to the electrically conductive core body.

By coating and adhering the warm active material slurry to the electrically conductive core body after heating the active material slurry in the manner above, the temperature gradient between the temperature of the atmosphere inside the drying furnace and that of the active material slurry can be reduced even if the active material slurry is fed inside the drying furnace for heating and drying. Thus, since the movement of the binder inside the active material slurry above is suppressed, the decrease in the amount of the binder can be thereby prevented from occurring. As a result, the adhesive force among the powder particles of the active material in the vicinity of the electrically conductive core body as well as the adhesive force between the electrically conductive core body and the powder of active material can be maintained. Thus, the adhesive strength of the elec. can be improved as to prevent the falling off of the active material layer from occurring from the electrically conductive core body.

Furthermore, in order to achieve the effect of heating the active material slurry according to the invention, it is particularly effective in case the process is applied to a method for producing an electrode for alkaline batteries comprising a drying step for drying the electrode comprising an electrically conductive core body having coated and adhered thereon the heated active material slurry, and a pressing step for rolling the dried electrode. The temperature for heating the slurry in the active material slurry heating step must be set lower than the drying temperature.

In this case, however, if the temperature of the heated active material slurry is lower than 30° C., the temperature gradient between the temperature of the atmosphere inside the drying furnace and that of the active material slurry does not decrease in the later step of drying. Hence, inside the drying furnace, the binder inside the active material slurry moves to the surface of the electrode as to decrease the amount of binder inside the active material layer in the vicinity of the electrically conductive core body. This results in a drop in adhesion strength between the electrically conductive core body and the powder of active material. Thus, the temperature of heating the slurry in the heating step for the active material slurry should be set to 30° C. or higher. However, if the slurry is heated to the decomposition temperature of the binder or higher, the binder can no longer exhibit the function of the binder. Hence, the upper limit of the temperature for heating the active material slurry should be set at a temperature as such that the binder would not undergo decomposition.

DESCRIPTION OF THE PREFERRED EMBODIMENTS

Figure 1:
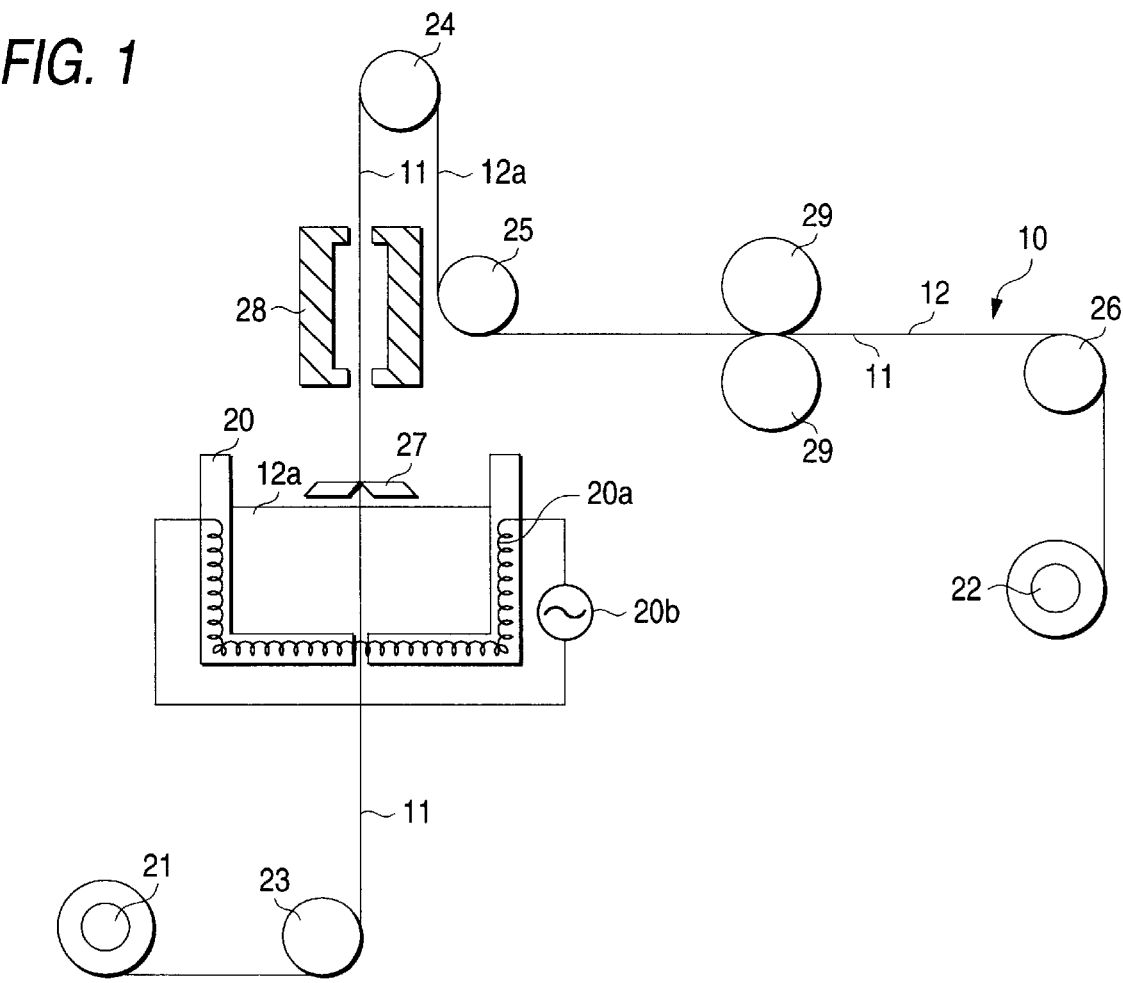
FIG. 1 is a cross section view showing schematically the progressive process steps comprising coating and adhering the active material slurry to an electrically conductive core body, and rolling the resulting body after drying the thus coated and adhered active material slurry.

An embodiment of practicing the invention in case of applying the invention to an electrode made of a hydrogen-absorbing alloy for use as an anode of a nickel-hydrogen battery is described below with reference to FIG. 1. FIG. 1 is a cross section view schematically showing the progressive process steps comprising coating and adhering the active material slurry to an electrically conductive core body, and rolling the resulting body after drying the thus coated and adhered active material slurry.

1. Apparatus for Producing an Electrode Made of a Hydrogen-Absorbing Alloy

An example of an apparatus for producing an electrode made of a hydrogen-absorbing alloy according to the invention comprises, as shown in FIG. 1, a winding out roll 21 consisting of a perforated nickel-plated steel sheet (for instance, a punching metal sheet 0.6 mm in thickness) wound up into a roll providing the electrically conductive core material 11, a winding up roll 22 for winding up the resulting electrode made of hydrogen-absorbing alloy 10 into a roll, conveyor rollers 23, 24, 25, and 26 for transferring the electrically conductive core material 11, a slurry reservoir 20 for forming the coating film by coating and adhering the active material slurry 12a to the electrically conductive core material 11, a slit 27 for adjusting the coated and adhered active material slurry 12a into a predetermined thickness, a drying furnace 28 for drying the coated and adhered active material slurry 12a, and a pair of pressing rolls 29 for rolling the dried electrode to a predetermined thickness.

In the embodiment of the example, the winding out roll 21 consisting of the perforated nickel-plated steel sheet wound up into a roll providing the electrically conductive core material 11 is placed at a predetermined position, and the front edge portion of the wound up electrically conductive core material wound up to the winding out roll 21 is wound around to the winding up roll 22 via the conveyor roller 23, the inside of the slurry reservoir 20, the slit 27, the drying furnace 28, the conveyor rollers 24 and 25, the pressing roll 29, and the conveyor roller 26. Furthermore, a heater 20a is provided to the wall of the slurry reservoir 20 to heat the active material slurry 12a enclosed inside the slurry reservoir 20 to a predetermined temperature, and an electric power source 20b is provided to the exterior thereof to supply electric current to the heater 20a.

2. Preparation of a Powder of the Hydrogen-Absorbing Alloy

Each of the commercially available metallic elements Mm (misch metal), Ni, Co, Al, and Mn was weighed and mixed at a predetermined ratio to provide an alloy expressed by $MmNi_{3.4}CO_{0.8}Al_{0.2}Mn_{0.6}$. After feeding the alloy to a high frequency melting furnace to melt, the molten alloy was filled into a casting mold and cooled to obtain bulk (an ingot) of the hydrogen-absorbing alloy expressed by $MmNi_{3.4}CO_{0.8}Al_{0.2}Mn_{0.6}$. After coarsely crushing the ingot of the hydrogen-absorbing alloy, it was further crushed mechanically under an inert gas atmosphere to obtain particles about 50 $\mu$m in average diameter as to obtain a powder of the hydrogen-absorbing alloy. The average particle size of the hydrogen-absorbing alloy powder was obtained by laser diffraction method.

3. Production of an Electrode of Hydrogen-Absorbing Alloy

Subsequently, to 99% by mass of the thus prepared hydrogen-absorbing alloy powder, a powder of polyethylene oxide (PEO) was added as a water-soluble binder at an amount of 1% by mass with respect to the mass of the hydrogen-absorbing alloy powder, and the resulting mixture was kneaded with a proper amount of water (or pure water) to prepare a slurry of hydrogen-absorbing alloy (active material slurry) 12a. The resulting hydrogen-absorbing alloy slurry 12a was placed inside the slurry reservoir 20. Then, after connecting a power source 20b to the heater 20a of the slurry reservoir 20, heater current was supplied to the heater 20a from the power source 20b to elevate the temperature inside the slurry reservoir 20 to the predetermined temperature. Thus, by winding up the winding up roll 22 at a constant rate, the electrically conductive core material 11 wound up into a roll on the winding out roll 21 is wound out from the winding out roll 21.

In this manner, the hydrogen-absorbing alloy slurry 12a adheres to the both sides of the electrically conductive core material 11 while it passes through the hydrogen-absorbing alloy slurry 12a placed inside the slurry reservoir 20 as to form a hydrogen-absorbing alloy layer 12a. Thereafter, the hydrogen-absorbing alloy slurry 12a adhered in excess is scraped off while the electrically conductive core material 11 passes through the slit 27 as to obtain a hydrogen-absorbing alloy layer 12a with adjusted coating thickness. The electrically conductive core material 11 having thereon the hydrogen-absorbing alloy layer 12a with its thickness adjusted to a predetermined value is fed inside the drying furnace 28 having its temperature maintained to approximately 60° C. as to obtain a dried hydrogen-absorbing alloy layer 12a after passage of a predetermined duration of time. The rotation speed of the winding up roll 22 is controlled as such that the hydrogen-absorbing alloy layer may reside inside the drying furnace 28 for 20 minutes.

Then, the electrically conductive core material 11 having its hydrogen-absorbing alloy layer 12a dried is passed through a pair of pressing rolls 29, so that it may result in a rolled hydrogen-absorbing alloy layer 12a with a predetermined thickness (0.6 mm). The hydrogen-absorbing alloy electrode 10 having the hydrogen-absorbing alloy layer 12 on both sides of the electrically conductive core material 11 is thus formed, and wound up by a winding up roll 22. The hydrogen-absorbing alloy electrode 10 thus prepared by heating the inside of the slurry reservoir 20 to maintain the hydrogen-absorbing alloy slurry 12a at a temperature of 30° C. is denoted as an electrode A of Example 1. Similarly, there were obtained a hydrogen-absorbing alloy electrode 10 as an electrode B of Example 2 by maintaining the temperature of the hydrogen-absorbing alloy slurry 12a at 35° C., and a hydrogen-absorbing alloy electrode 10 as an electrode B of Example 3 by maintaining the temperature of the hydrogen-absorbing alloy slurry 12a at 40° C. Further, a hydrogen-absorbing alloy electrode 10 was produced without heating the inside of the slurry reservoir 20, thereby maintaining the temperature of the hydrogen-absorbing alloy slurry 12a at an ordinary temperature (20° C.), to provide an electrode X for Comparative Example.

Figure 2:
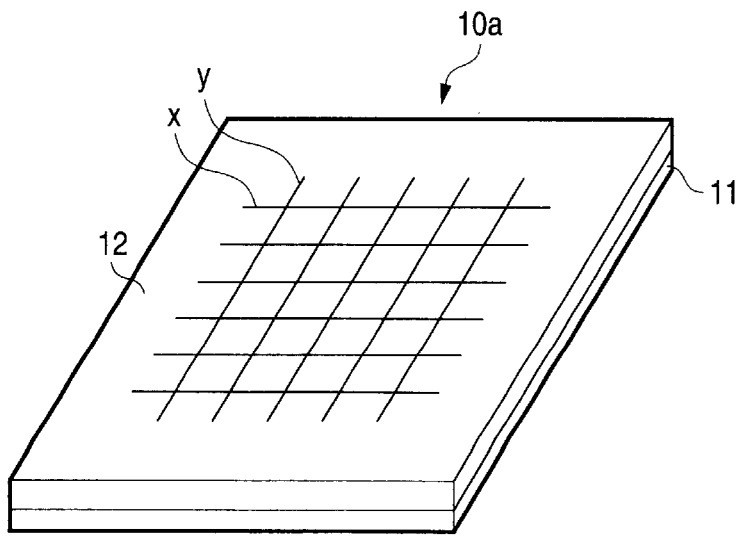
FIG. 2 is a perspective view showing schematically the state in which cut grooves are formed on the active material layer in a checker board arrangement, such that it may be subjected to a drop test of the active material.

4. Measurement of the Adhesion Strength of the Hydrogen-Absorbing Alloy Electrode Then, each of the hydrogen-absorbing alloy electrodes 10 (A, B, C, and x) thus produced was cut into a predetermined size, and the hydrogen-absorbing alloy layer 12 on one side thereof was shaved and lightly rubbed with an waste cloth to remove the shave residue. Thus were obtained each of the specimens of the hydrogen-absorbing alloy electrode 10a. The adhesion strength of each of specimens of the hydrogen-absorbing alloy electrodes 10a was measured. Referring to FIG. 2, on measuring the adhesion strength, a cutter (not shown) was maintained to make an angle of about 30 degrees with respect to the surface of the hydrogen-absorbing alloy layer 12 of each of the specimens of the hydrogen-absorbing alloy electrodes 10a, and the hydrogen-absorbing alloy layer 12 was cut to form cut grooves x and y in such a manner that a load of about 250 g would be applied to the edge of the cutter blade. The cut grooves x and y were provided at an interval of 1 mm, and 10 grooves each were provided as grooves x and y in such a manner that they may cross with each other making right angles.

Thus, by providing ten each of the cut grooves x and y in such manner that they may cross with each other making right angles, 100 squares were provided in a checker board arrangement on each of the hydrogen-absorbing alloy electrode 10a specimens. Ten sheets each of the hydrogen-absorbing alloy electrode 10a specimens having formed thereon the 100 squares in a checker board arrangement were raised to a height of about 100 mm in such a manner that the hydrogen-absorbing alloy electrode 10a specimen may be aligned vertically, and were each allowed to a free drop. The drop test was repeated three times, and the number of squares dropped off from the checker board arrangement was counted to obtain an average number. The results are given in Table 1 below.

TABLE 1

| Type of electrode specimen | Slurry temperature (° C.) | Average number dropped (units) |
| --- | --- | --- |
| A | 30 | 10 |
| B | 35 | 8 |
| C | 40 | 7 |
| X | 20 | 30 |

From the results shown in Table 1, it can be clearly understood that, with respect to the average number of dropped squares amounting to 30 units for the case of the hydrogen-absorbing alloy electrode specimen X in which the temperature of the hydrogen-absorbing alloy slurry 12a is set to 20° C. (ordinary temperature), the average number of dropped squares for the hydrogen-absorbing alloy electrode specimen A obtained by setting the temperature of the hydrogen-absorbing alloy slurry temperature to 30° C. was found to be 10 units, the same for the hydrogen-absorbing alloy electrode specimen B obtained at a the hydrogen-absorbing alloy slurry temperature to 35° C. was found to be 8 units, and the same for the hydrogen-absorbing alloy electrode specimen C obtained at a the hydrogen-absorbing alloy slurry temperature to 40° C. was found to be 7 units. Conclusively, it can be understood that the average number of dropped squares considerably decreases with elevating the temperature of the hydrogen-absorbing alloy slurry 12a as compared with the case of the hydrogen-absorbing alloy electrode X specimen.

In case the heated hydrogen-absorbing alloy slurry 12a is coated and adhered to the electrically conductive core body 11, the temperature gradient between the temperature (about 60° C.) of the atmosphere inside the drying furnace 28 and that (30 to 40° C.) of the hydrogen-absorbing alloy slurry 12a can be reduced even if the hydrogen-absorbing alloy slurry 12a is fed inside the drying furnace 28. Hence, the transfer of the binder contained in the hydrogen-absorbing alloy slurry 12a to the surface of the hydrogen-absorbing alloy electrode 10 can be suppressed. In this manner, the amount of the binder inside the active material layer in the vicinity of the conductive core body 11 can be prevented from being reduced, and hence, presumably, the adhesive force among the powder particles of hydrogen-absorbing alloy in the vicinity of the electrically conductive core body 11 as well as the adhesive force between the electrically conductive core body and the powder of hydrogen-absorbing alloy is maintained. As a result, the adhesive force of the hydrogen-absorbing alloy electrode 10 is increased as to make it possible to prevent the active material layer 12 from dropping off from the electrically conductive core body 11.

In this case, however, if the temperature of the heated hydrogen-absorbing alloy slurry 12a should be lower than 30° C., the temperature gradient between the temperature of the atmosphere inside the drying furnace 28 and that of the hydrogen-absorbing alloy slurry 12a becomes high. Hence, on drying the hydrogen-absorbing alloy slurry 12a, the binder inside the hydrogen-absorbing alloy slurry 12a moves to the surface of the hydrogen-absorbing alloy electrode 10 as to decrease the amount of binder inside the hydrogen-absorbing alloy layer 12a in the vicinity of the electrically conductive core body 11. This results in a drop in adhesive force among the hydrogen-absorbing alloy powder particles present in the vicinity of the electrically conductive core body 11 as well as that between the electrically conductive core body 11 and the powder of hydrogen-absorbing alloy.

Thus, the temperature of heating the hydrogen-absorbing alloy slurry 12a should be set to 30° C. or higher. However, if the hydrogen-absorbing alloy slurry 12a is heated to the decomposition temperature of the binder or higher, the binder can no longer exhibit the function of the binder. Hence, the upper limit of the temperature for heating the hydrogen-absorbing alloy slurry 12a should be set at a temperature as such that the binder would not undergo decomposition.

As described above, the heated hydrogen-absorbing alloy slurry 12a is coated and adhered to the electrically conductive core body 11. Thus, even if drying should be effected rapidly at a high temperature inside the drying furnace 28, the temperature gradient between the temperature of the atmosphere inside the drying furnace 28 and that of the hydrogen-absorbing alloy slurry 12a can be decreased. Thus, even in case the productivity of the hydrogen-absorbing alloy electrode should be increased by performing rapid drying at a high temperature, the decrease in the amount of the binder contained in the active material layer in the vicinity of the electrically conductive core body 11 can be prevented from occurring. In this manner, the adhesive force among the hydrogen-absorbing alloy powder particles present in the vicinity of the electrically conductive core body 11 as well as that between the electrically conductive core body 11 and the powder of hydrogen-absorbing alloy can be maintained as to increase the adhesion strength of the hydrogen-absorbing alloy electrode 10. Thus, the falling off of the active material layer 12 from the electrically conductive core body 11 can be prevented from occurring.

In the embodiment described above, description has been provided for a case in which a heater 20a is provided inside the slurry reservoir 20, and the hydrogen-absorbing alloy slurry 12a filled in the slurry reservoir 20 is heated to a predetermined temperature by supplying the heater current to the heater 20a connected to a power source 20b. However, the means for heating the hydrogen-absorbing alloy slurry 12a to a predetermined temperature is not only limited thereto, but various other heat sources can be used to heat the slurry reservoir 20, or the hydrogen-absorbing alloy slurry 12a may injected into the slurry reservoir 20 after heating the slurry outside the slurry reservoir 20.

Further, in the embodiment described above, explanation has been made specifically on a case in which the hydrogen-absorbing alloy layer 12 was dried by maintaining the temperature (heating temperature) of the atmosphere inside the drying furnace 28 at about 60° C. However, as the temperature (heating temperature) of the atmosphere inside the drying furnace 28, any temperature in a range of from 50 to 100° C. may be properly selected by taking into consideration the active material constituting the active material slurry, the binder, the thickness of the resulting electrode, and the like. In case of varying the drying temperature for the electrode having coated and adhered thereon the active material, the temperature of the active material slurry should be changed accordingly, in such a manner that the temperature gradient with respect to the active material slurry would not be increased.

Furthermore, in the embodiment of the example above, explanation has been made on a case using a hydrogen-absorbing alloy expressed by $MmNi_{3.4}CO_{0.8}Al_{0.2}Mn_{0.6}$, however, there may be used other types of hydrogen-absorbing alloys such as that expressed by $Mm_aNi_bCo_cAl_dMn_e$, or the $AB_5$ type rare earth metal based hydrogen-absorbing alloys such as the $LaNi_5$ based alloys in which a part of Ni is substituted by Co and Al, W, etc. Additionally, although in the embodiment of the example above, description has been provided for a case of using a mechanically size-reduced hydrogen-absorbing alloy. However, there can be used a hydrogen-absorbing alloy prepared by atomization method, or a mixed powder obtained by mixing a crushed alloy thereto.

In the embodiment described in the example above, explanation has been made specifically on a case of applying the production method of the invention to a hydrogen-absorbing alloy electrode. However, the invention not only is limited to hydrogen-absorbing alloy electrodes, but also is applicable to electrodes of various types of alkaline batteries that are formed by coating and adhering an active material slurry directly to an electrically conductive core body such as a cadmium electrode and a nickel electrode.

Further, in the embodiment described in the example above, explanation has been made specifically on a case of using polyethylene oxide (PEO) as the binder. However, the binder is not only limited to PEO, but also usable are various types of binders. In this case, the solvent must be properly selected depending on the binder used.

What is claimed is:

1. A method for producing an electrode for alkaline batteries, which is formed by coating and adhering a slurry of an active material comprising a powder of hydrogen absorbing alloy, a water-soluble binder, and water or purified water as a solvent for the water-soluble binder on an electrically conductive core body, said method comprising:

a step of preparing a slurry of an active material by mixing the powder of hydrogen-absorbing alloy with the water-soluble binder and the solvent for the water-soluble binder;

a step of heating the slurry of the active material;

a step of coating and adhering slurry, in which the heated slurry is coated and adhered to the electrically conductive core body;

a step of drying the electrically conductive core body to which the heated slurry is coated and adhered so as to form an electrode while the active material is being heated by the dryer; and a pressing step of rolling the electrode wherein the temperature of heating the slurry in the step of heating the slurry is lower than the temperature in the drying step.

2. A method for producing an electrode for alkaline batteries as claimed in claim 1, wherein, the heating temperature for the slurry in the step of heating the slurry is 30° C. or higher.

* * * * *